US011418041B2

(12) United States Patent
Bober

(10) Patent No.: US 11,418,041 B2
(45) Date of Patent: *Aug. 16, 2022

(54) BATTERY SYSTEM

(71) Applicant: LG Chem, Ltd., Seoul (KR)

(72) Inventor: Greg Bober, Saint Clair Shores, MI (US)

(73) Assignee: LG Energy Solution, Ltd., Seoul (KR)

( * ) Notice: Subject to any disclaimer, the term of this patent is extended or adjusted under 35 U.S.C. 154(b) by 193 days.

This patent is subject to a terminal disclaimer.

(21) Appl. No.: 16/354,328

(22) Filed: Mar. 15, 2019

(65) Prior Publication Data

US 2020/0295578 A1  Sep. 17, 2020

(51) Int. Cl.
*H02J 7/00* (2006.01)

(52) U.S. Cl.
CPC .......... *H02J 7/0016* (2013.01); *H02J 7/0021* (2013.01)

(58) Field of Classification Search
CPC .................................................. G01R 31/396
See application file for complete search history.

(56) References Cited

U.S. PATENT DOCUMENTS

| | | | | |
|---|---|---|---|---|
| 6,255,826 B1* | 7/2001 | Ohsawa | ................ | H02J 7/0021 324/426 |
| 7,679,369 B2* | 3/2010 | Hartzog | ............. | G01R 19/0084 324/426 |
| 8,788,225 B2* | 7/2014 | Wood | ................. | G01R 31/3835 702/63 |
| 8,902,072 B2* | 12/2014 | Lee | ......................... | G01R 31/28 340/649 |
| 9,494,653 B2* | 11/2016 | Okaniwa | ............... | G01R 31/396 |
| 10,063,068 B1* | 8/2018 | McCormick | ......... | G01R 31/396 |
| 2004/0155629 A1* | 8/2004 | Kobayashi | ............ | H02J 7/0016 320/127 |

(Continued)

FOREIGN PATENT DOCUMENTS

| | | | |
|---|---|---|---|
| JP | 3300309 B2 | | 4/2002 |
| JP | 2007010580 A | * | 1/2007 |

(Continued)

OTHER PUBLICATIONS

Yoshida, Voltage measurement apparatus JP 2007010580 translation (Year: 2007).*

*Primary Examiner* — Drew A Dunn
*Assistant Examiner* — Tynese V McDaniel
(74) *Attorney, Agent, or Firm* — Buckert Patent & Trademark Law Firm PC; John F. Buckert

(57) ABSTRACT

A battery system includes a first cell balancing circuit electrically coupled to first and second sense lines and to a first battery cell. The battery system includes an integrated circuit measuring a first cell voltage between first and second sense lines at a first time while a first cell balancing circuit is turned off, and a second cell voltage between second and third sense lines at the first time while the second cell balancing circuit is turned off, and determining first and second cell voltage values based on the first and second cell voltages, respectively. A microcontroller receives the first and second cell voltage values and determines that an open circuit condition exists in the first balancing circuit if the first cell voltage value is greater than a first threshold voltage value, or the second cell voltage value is less than a second threshold voltage value.

8 Claims, 3 Drawing Sheets

(56) References Cited

U.S. PATENT DOCUMENTS

| | | | | |
|---|---|---|---|---|
| 2008/0143298 A1* | 6/2008 | Yoshida | ............... | H02J 7/0026 320/136 |
| 2009/0309545 A1* | 12/2009 | Kunimitsu | ............ | H02J 7/0016 320/118 |
| 2011/0285538 A1* | 11/2011 | Lee | ..................... | G01R 31/28 324/433 |
| 2011/0285539 A1* | 11/2011 | Lee | ................. | H01M 10/4207 324/537 |
| 2014/0253135 A1* | 9/2014 | Eguchi | ................ | H02J 7/0048 324/434 |
| 2017/0271888 A1* | 9/2017 | McCormick | ......... | G01R 31/364 |
| 2019/0356143 A1* | 11/2019 | Lee | ................. | H01M 10/4285 |
| 2019/0361075 A1* | 11/2019 | Lee | ...................... | H02J 7/0016 |
| 2020/0295407 A1* | 9/2020 | Bober | ............... | G01R 31/371 |
| 2021/0156929 A1* | 5/2021 | Lee | ....................... | G01R 31/64 |
| 2021/0336301 A1* | 10/2021 | Hwang | .............. | H01M 10/425 |

FOREIGN PATENT DOCUMENTS

| | | | |
|---|---|---|---|
| JP | 2007010580 | * | 10/2007 |
| JP | 4775415 B2 | | 7/2011 |
| JP | 4904729 B2 | | 1/2012 |

* cited by examiner

BATTERY SYSTEM

BACKGROUND

A known battery system may measure a random cell voltage value through a cell balancing circuit. In particular, due to the limitations of the physical circuit hardware, the cell voltage value read by a microcontroller when an open circuit condition undesirably exists in a cell balancing circuit is often similar to a normal cell voltage value when an open circuit condition is not present, which makes detection of the open circuit condition not feasible.

The inventor herein has recognized a need for an improved battery system that utilizes at least first and second resistors in first and second cell balancing circuits with different resistance values to pre-bias the cell voltage inputs received by an integrated circuit to a specific known value pattern to detect an open circuit condition in the first and second cell balancing circuits.

SUMMARY

A battery system in accordance with an exemplary embodiment is provided. The battery system includes a first cell balancing circuit electrically coupled to first and second sense lines and to first and second electrical terminals of a first battery cell. The first cell balancing circuit has a first transistor electrically coupled in parallel to the first battery cell, and a first resistor electrically coupled to the first and second sense lines. The battery system further includes a second cell balancing circuit electrically coupled to the second sense line and a third sense line and to first and second electrical terminals of a second battery cell. The second cell balancing circuit has a second transistor electrically coupled in parallel to the second battery cell, and a second resistor electrically coupled to the second and third sense lines. The first resistor has a first resistance that is greater than a second resistance of the second resistor. The battery system further includes a microcontroller that commands each of the first and second transistors to transition to an open operational state such that the first and second balancing circuits, respectively, are turned off. The battery system further includes an integrated circuit measuring a first cell voltage between the first and second sense lines at a first time while the first cell balancing circuit is turned off, and a second cell voltage between the second and third sense lines at the first time while the second cell balancing circuit is turned off, and determining first and second cell voltage values based on the first and second cell voltages, respectively. The microcontroller receives the first and second cell voltage values and determines that an open circuit condition exists in the first balancing circuit if the first cell voltage value is greater than a first threshold voltage value, or the second cell voltage value is less than a second threshold voltage value.

DETAILED DESCRIPTION

Figure 1:
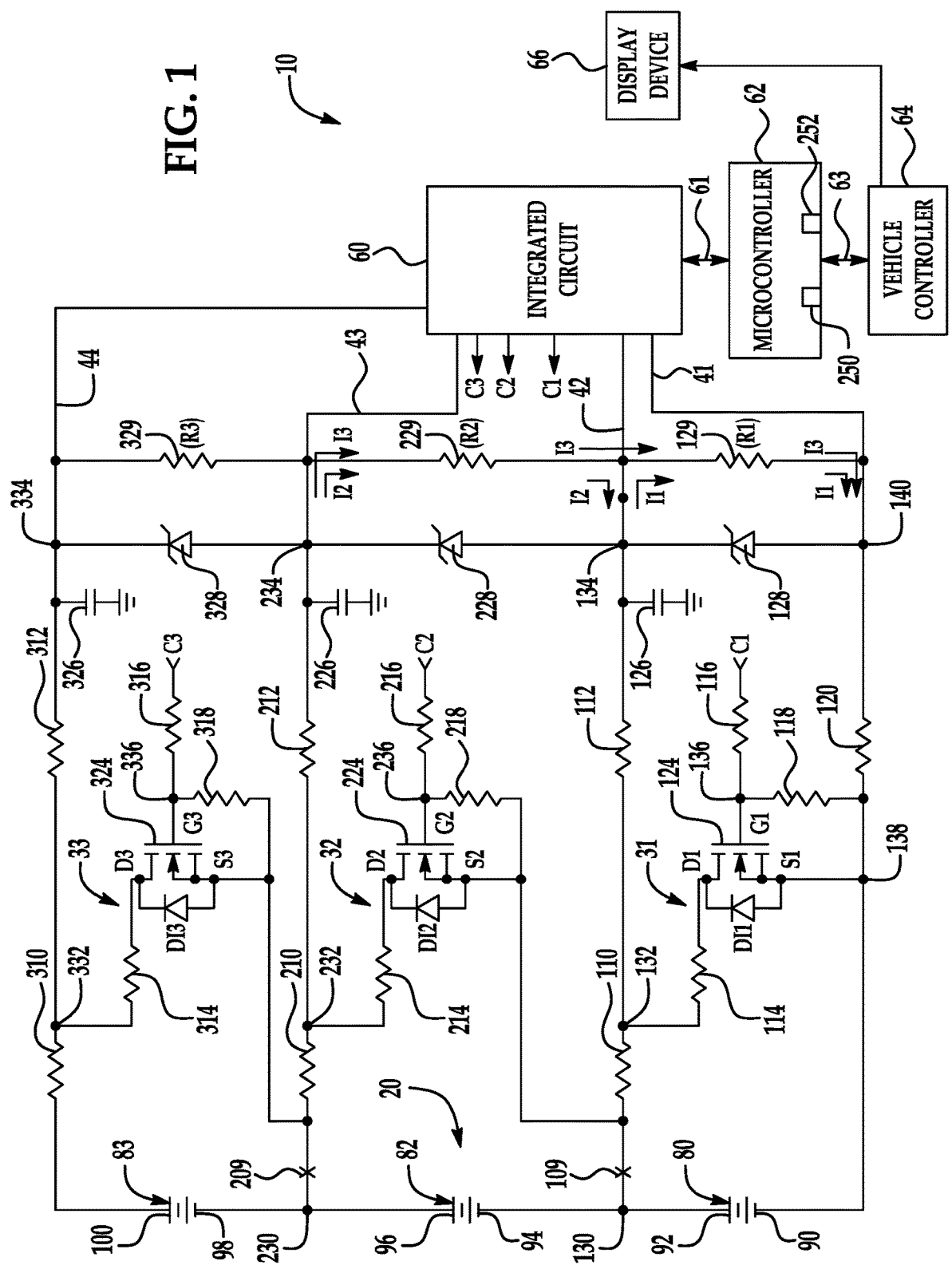
FIG. 1 is a schematic of a battery system in accordance with an exemplary embodiment.

Referring to FIG. 1, a battery system 10 in accordance with an exemplary embodiment is provided. The battery system 10 includes a battery module 20, a first cell balancing circuit 31, a second cell balancing circuit 32, a third cell balancing circuit 33, a first sense line 41, a second sense line 42, a third sense line 43, a fourth sense line 43, an integrated circuit 60, a communication bus 61, a microcontroller 62, a communication bus 63, a vehicle controller 64, and a display device 66.

An advantage of the battery system 10 is that the microcontroller 62 utilizes resistors 129, 229, 329 having a specific resistance pattern (e.g., resistor 129 has a different resistance than 229, and resistor 229 has a different resistance than resistor 329) to detect open circuit conditions in the cell balancing circuits 31, 32, 33.

The battery module 20 includes a first battery cell 80, a second battery cell 82, and a third battery cell 83 electrically coupled in series with one another.

The first battery cell 80 includes a first electrical terminal 90 and a second electrical terminal 92. In an exemplary embodiment, the first battery cell 80 is a pouch-type lithium-ion battery cell. In an alternative embodiment, the first battery cell 80 is another type of battery cell known to those skilled in the art. The first battery cell 80 is electrically coupled to the first cell balancing circuit 31.

The second battery cell 82 includes a first electrical terminal 94 and a second electrical terminal 96. In an exemplary embodiment, the second battery cell 82 is a pouch-type lithium-ion battery cell. In an alternative embodiment, the second battery cell 82 is another type of battery cell known to those skilled in the art. The second battery cell 82 is electrically coupled to the second balancing circuit 32.

The third battery cell 83 includes a first electrical terminal 98 and a second electrical terminal 100. In an exemplary embodiment, the third battery cell 83 is a pouch-type lithium-ion battery cell. In an alternative embodiment, the third battery cell 83 is another type of battery cell known to those skilled in the art. The third battery cell 83 is electrically coupled to the third balancing circuit 33.

The first cell balancing circuit 31 is adapted to selectively discharge an electrical current from the first battery cell 80. The first cell balancing circuit 31 includes resistors 110, 112, 114, 116, 118, 120, a transistor 124, a capacitor 126, a Zener diode 128, a resistor 129, and electrical nodes 130, 132, 134, 136, 138, 140.

The resistor 110 is electrically coupled to the electrical node 130 and to the second electrical terminal 92 of the battery cell 80. In an exemplary embodiment, the resistor 110 has a resistance of 2 ohms. The resistor 114 is electrically coupled to and between the electrical node 132 and the drain D1 of the transistor 124.

The transistor 124 is adapted to control a balancing electrical current from the first battery cell 80. The transistor 124 includes a gate terminal G1, the drain terminal D1, a source terminal S1, and an internal diode DI1.

The drain terminal D1 is electrically coupled to the resistor 114. The source terminal S1 is electrically coupled to the electrical node 138, and the electrical node 138 is electrically coupled to the first electrical terminal 90 of the first battery cell 80. The gate terminal G1 is electrically coupled to the electrical node 136.

The resistor 116 is electrically coupled to and between the electrical node 136 and to the integrated circuit 60. Further, the resistor 118 is electrically coupled to and between the electrical node 136 and electrical node 138, and is electrically coupled in parallel between the gate terminal G1 and the source terminal S1 of the transistor 124. The microcontroller 62 sends a first command message to the integrated circuit 60 to induce the integrated circuit 60 to selectively generate a control voltage C1 having a high logic level that is divided by the resistors 116, 118 and is thereafter applied to the gate G1 for turning on the transistor 124.

The resistor 120 is electrically coupled to and between the electrical node 138 and the electrical node 140. The electrical node 140 is further electrically coupled through the first sense line 41 to the integrated circuit 60.

The resistor 112 is electrically coupled to and between the electrical node 132 and an electrical node 134. The electrical node 134 is further electrically coupled through the second sense line 42 to the integrated circuit 60. The capacitor 126 is coupled to and between the electrical node 134 and electrical ground. Further, the Zener diode 128 is coupled to and between the electrical node 134 and the electrical node 140, and is electrically coupled between the sense lines 41, 42.

The resistor 129 is electrically coupled to and between the electrical nodes 134, 140 on the sense lines 42, 41, respectively. In an exemplary embodiment, the resistor 129 has a resistance of 10 mega-ohms.

To perform battery cell balancing, the microcontroller 62 sends a first command message to the integrated circuit 60, the integrated circuit 60 generates the control signal C1 having a high logic level that is received by the transistor 124. In response to the control signal C1 having the high logic level, the transistor 124 turns on which allows an electrical current to flow through the resistor 110, and the resistor 114, and the transistor 124 to at least partially discharge the battery cell 80.

The second cell balancing circuit 32 is adapted to selectively discharge an electrical current from the second battery cell 82. The second cell balancing circuit 32 includes resistors 210, 212, 214, 216, 218, 110, 112, a transistor 224, a capacitor 226, a Zener diode 228, a resistor 229, and electrical nodes 230, 232, 234, 236, 130.

The resistor 210 is electrically coupled to the electrical node 232 and to the second electrical terminal 96 of the battery cell 82. In an exemplary embodiment, the resistor 210 has a resistance of 2 ohms. The resistor 214 is electrically coupled to and between the electrical node 232 and the drain D2 of the transistor 224.

The transistor 224 is adapted to control a balancing electrical current from the second battery cell 82. The transistor 224 includes a gate terminal G2, a drain terminal D2, a source terminal S2, and an internal diode DI2.

The drain terminal D2 is electrically coupled to the resistor 214. The source terminal S2 is electrically coupled to the electrical node 130, and the electrical node 130 is electrically coupled to the first electrical terminal 94 of the second battery cell 82. The gate terminal G2 is electrically coupled to the electrical node 236.

The resistor 216 is electrically coupled to and between the electrical node 236 and to the integrated circuit 60. Further, the resistor 218 is electrically coupled to and between the electrical node 236 and electrical node 130, and is electrically coupled in parallel between the gate terminal G2 and the source terminal S2 of the transistor 224. The microcontroller 62 sends a second command message to the integrated circuit 60 to induce the integrated circuit 60 to selectively generate a control voltage C2 having a high logic level that is divided by the resistors 216, 218 and is thereafter applied to the gate G2 for turning on the transistor 224.

The resistor 212 is electrically coupled to and between the electrical node 232 and an electrical node 234. The electrical node 234 is further electrically coupled through the third sense line 43 to the integrated circuit 60. The capacitor 226 is coupled to and between the electrical node 234 and electrical ground. Further, the Zener diode 228 is coupled to and between the electrical node 234 and the electrical node 134, and is electrically coupled between the second and third sense lines 42, 43.

The resistor 229 is electrically coupled to and between the electrical nodes 234, 134 on the sense lines 43, 42, respectively. In an exemplary embodiment, the resistor 229 has a resistance of 3 mega-ohms.

To perform battery cell balancing, the microcontroller 62 sends a second command message to the integrated circuit 60 to induce the integrated circuit 60 to generate the control signal C2 having a high logic level that is received by the transistor 224, and in response the transistor 224 turns on which allows an electrical current to flow through the resistor 210, and the resistor 214, and the transistor 224 to at least partially discharge the battery cell 82.

The third cell balancing circuit 33 is adapted to selectively discharge an electrical current from the third battery cell 83. The third cell balancing circuit 33 includes resistors 310, 312, 314, 316, 318, 212, 210, a transistor 324, a capacitor 326, a Zener diode 328, a resistor 329, and electrical nodes 332, 334, 336, 230, 234.

The resistor 310 is electrically coupled to the electrical node 332 and to the second electrical terminal 100 of the battery cell 83. In an exemplary embodiment, the resistor 310 has a resistance of 2 ohms. The resistor 314 is electrically coupled to and between the electrical node 332 and the drain D3 of the transistor 324.

The transistor 324 is adapted to control a balancing electrical current from the third battery cell 83. The transistor 324 includes a gate terminal G3, a drain terminal D3, a source terminal S3, and an internal diode DI3.

The drain terminal D3 is electrically coupled to the resistor 314. The source terminal S3 is electrically coupled to the electrical node 230, and the electrical node 230 is electrically coupled to the first electrical terminal 98 of the third battery cell 83. The gate terminal G3 is electrically coupled to the electrical node 336.

The resistor 316 is electrically coupled to and between the electrical node 336 and to the integrated circuit 60. Further, the resistor 318 is electrically coupled to and between the electrical node 336 and electrical node 230, and is electrically coupled in parallel between the gate terminal G3 and the source terminal S3 of the transistor 324. The microcontroller 62 sends a third command message to the integrated circuit 60 to induce the integrated circuit 60 to selectively generate a control voltage C3 having a high logic level that is divided by the resistors 316, 318 and is thereafter applied to the gate G3 for turning on the transistor 324.

The resistor 312 is electrically coupled to and between the electrical node 332 and an electrical node 334. The electrical node 334 is further electrically coupled through the fourth sense line 44 to the integrated circuit 60. The capacitor 326 is coupled to and between the electrical node 334 and electrical ground. Further, the Zener diode 328 is coupled to and between the electrical node 334 and the electrical node 234, and is electrically coupled between the third and fourth sense lines 43, 44.

The resistor 329 is electrically coupled to and between the electrical nodes 334, 234 on the sense lines 44, 43, respectively. In an exemplary embodiment, the resistor 329 has a resistance of 10 mega-ohms.

To perform battery cell balancing, the microcontroller 62 sends a third command message to the integrated circuit 60 to induce the integrated circuit 60 to generate the control signal C3 having a high logic level that is received by the transistor 324, and in response the transistor 324 turns on which allows an electrical current to flow through the resistor 310, and the resistor 314, and the transistor 324 to at least partially discharge the battery cell 83.

The first and second sense lines 41, 42 are utilized by the integrated circuit 60 to measure a voltage across the resistor 129 to detect open circuit conditions. The first sense line 41 is electrically coupled to and between the electrical node 140 and the integrated circuit 60. Further, the second sense line 42 is electrically coupled to and between the electrical node 134 and the integrated circuit 60.

The second and third sense lines 42, 43 are utilized by the integrated circuit 60 to measure a voltage across the resistor 220 to detect open circuit conditions. As discussed above, the second sense line 42 is electrically coupled to and between the electrical node 134 and the integrated circuit 60. The third sense line 43 is electrically coupled to and between the electrical node 234 and the integrated circuit 60.

The third and fourth sense lines 43, 44 are utilized by the integrated circuit 60 to measure a voltage across the resistor 329 to detect open circuit conditions. As discussed above, the third sense line 43 is electrically coupled to and between the electrical node 234 and the integrated circuit 60. The fourth sense line 44 is electrically coupled to and between the electrical node 334 and the integrated circuit 60.

The integrated circuit 60 is electrically coupled to the first, second, third, and fourth sense lines 41, 42, 43, 44 and to the resistors 116, 216, 316. The integrated circuit 60 operably communicates with the microcontroller 62 utilizing a communication bus 61. The integrated circuit 60 measures a voltage between the first and second sense lines 41, 42 and sends an associated voltage value indicating a voltage across the resistor 129 to the microcontroller 62. Further, the integrated circuit 60 measures a voltage between the second and third sense lines 42, 43 and sends an associated voltage value indicating a voltage across the resistor 229 to microcontroller 26. Further, the integrated circuit 60 measures a voltage between the third and fourth sense lines 43, 44 and sends an associated voltage value indicating a voltage across the resistor 329 to microcontroller 62.

It is noted that since the resistors 129, 229, 329 have an alternating resistance pattern (e.g., 10 mega-ohm, 3 mega-ohm, 10 mega-ohm), the voltages across the resistors 129, 229, 329 can be utilized to determine when an open circuit condition exists in the first, second, and third balancing circuits 31, 32, 33.

The microcontroller 62 generates command messages to induce the integrated circuit 60 to turn on and to turn off the transistors 124, 224, 334 in the first, second, and third cell balancing circuits 31, 32, 33, respectively.

The microcontroller 62 can detect fault conditions in the first, second, and third balancing circuits 31, 32, 33 based on the voltages across the resistors 129, 229, 329, and generate associated fault condition codes that are sent to the vehicle controller 64, as will be explained in greater detail below. The microcontroller 62 includes a microprocessor 250 and a memory device 252. The microprocessor 250 is programmed to execute a software program stored in the memory device 252 to implement at least a portion of the operational steps associated with the microprocessor 250 that will be described hereinafter. The microcontroller 62 operably communicates with the integrated circuit 60 utilizing the communication bus 61. Also, the microcontroller 62 operably communicates with the vehicle controller 64 utilizing the communication bus 63.

For purposes of understanding, a brief explanation of an open circuit diagnostic test associated with the first and second balancing circuits 31, 32 will be provided. To perform the open circuit diagnostic test, the microcontroller 62 sends third and fourth command messages to the integrated circuit 60, and in response the integrated circuit 60 generates the control signals C1, C2, respectively, each having a low logic level that are received by the transistors 124, 224, respectively. In response to the control signals C1, C2 each having the low logic level, the transistors 124, 224 turn off.

When no open circuit exists at node 109, the voltage across the biasing resistor 129 (which is substantially equal to the voltage output by battery cell 80) is substantially equal to the voltage across biasing resistor 229 (which is substantially equal to the voltage output by battery cell 82). Further, a current I1 flows through resistor 129 (having a resistance R1), the resistor 120, the battery cell 80, and resistor 110, the resistor 112. Further, the current I2 flows through resistor 229 (having a resistance R2), the resistor 112, the resistor 110, the battery cell 82, the resistor 210, and the resistor 212.

Alternately, when an open circuit undesirably exists at node 109, the current I3 flows through biasing resistors 229, 129, the resistors 120, the battery cells 80, 82, the resistor 210, and the resistor 212. As a result, the voltage across resistor 129 (e.g., R1 voltage=(Vcell_80+Vcell_82)*(R1/(R1+R2)) increases, and the voltage across resistor 229 (e.g., R2 voltage=(Vcell_80+Vcell_82)*(R2/(R1+R2)) decreases—as compared to the normal operation voltages when no open circuit condition exists at node 109. If the voltage across resistor 129 is greater than a first threshold voltage value, an open circuit condition is detected at node 109. Further, if the voltage across resistor 229 is less than a second voltage value, the open circuit condition is detected at node 109. The first voltage value is greater than the second voltage value.

Figure 2:
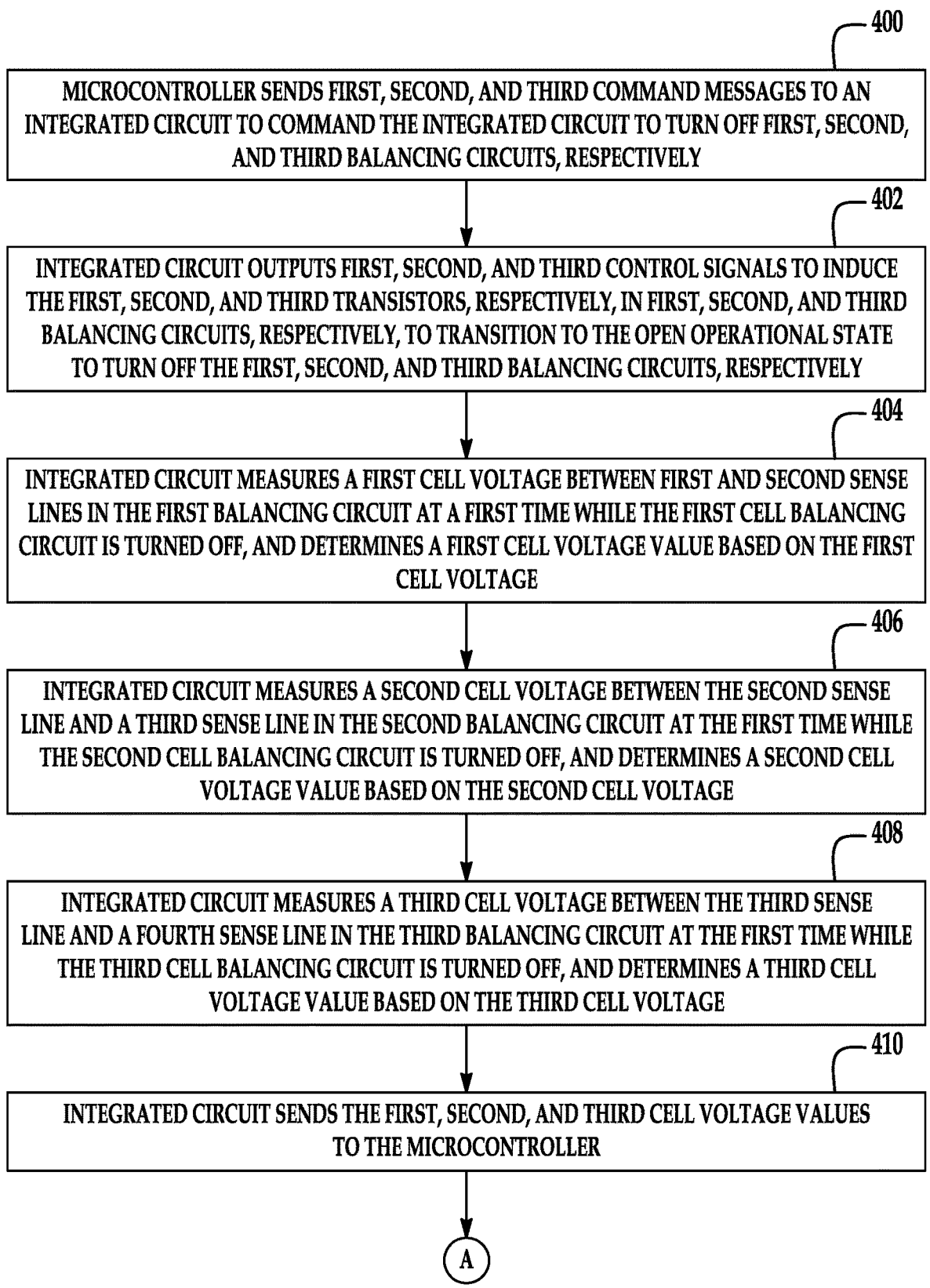
FIGS. 2-3 are flowcharts of a method for determining open circuit conditions in cell balancing circuits within the battery system of FIG. 1 in accordance with another exemplary embodiment.
Figure 3:
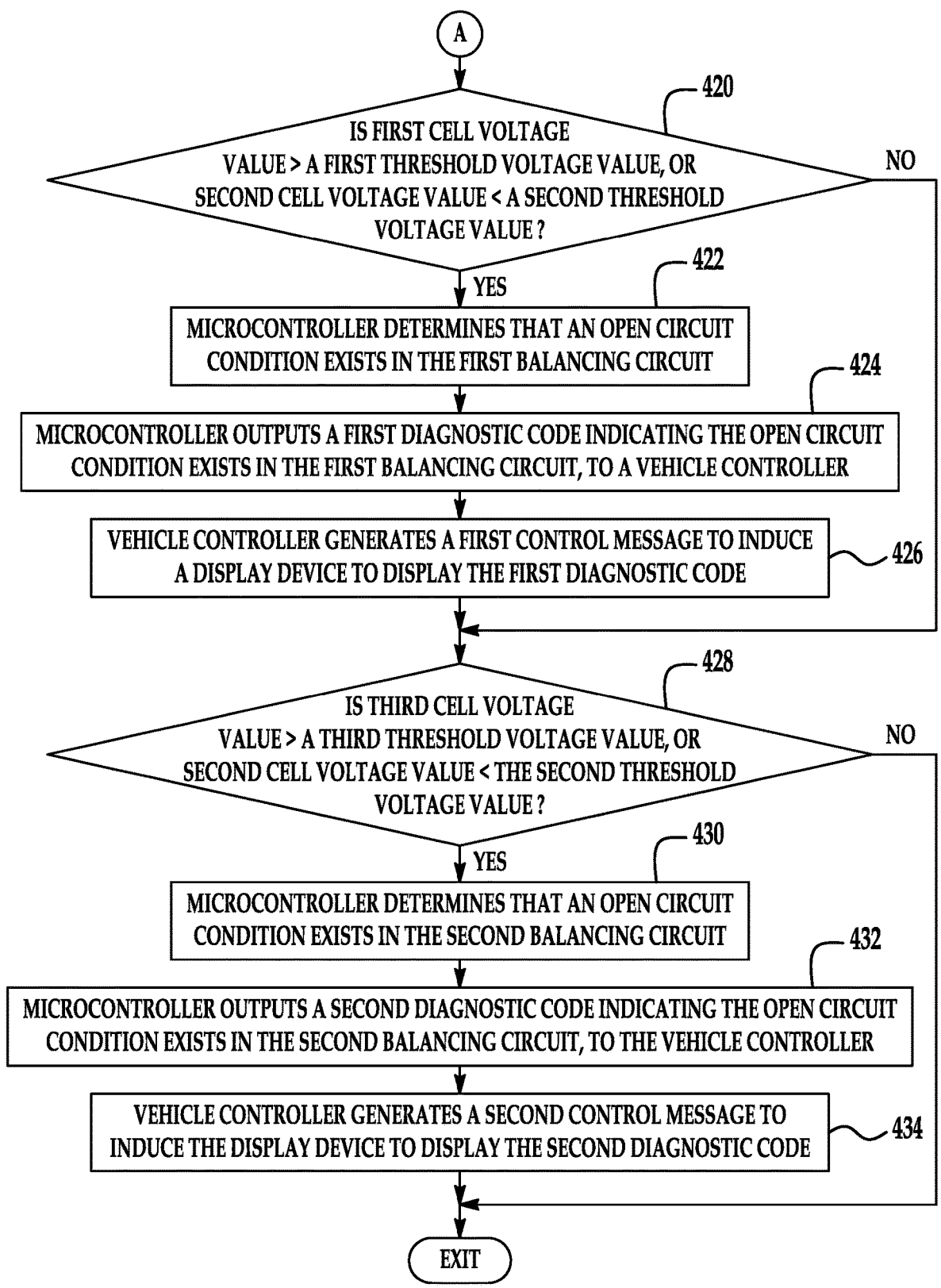

Referring to FIGS. 1-3, a flowchart of a diagnostic method for the battery system 10 in accordance with another exemplary embodiment will now be explained.

At step 400, the microcontroller 62 sends first, second, and third command messages to an integrated circuit 60 to command the integrated circuit 60 to turn off first, second, and third balancing circuits 31, 32, 33, respectively. After step 400, the method advances to step 402.

At step 402, the integrated circuit 60 outputs first, second, and third control signals to induce the first, second, and third transistors 124, 224, 324, respectively, in first, second, and third balancing circuits 31, 32, 33, respectively, to transition to the open operational state to turn off the first, second, and third balancing circuits 31, 32, 33, respectively. After step 402, the method advances to step 404.

At step 404, the integrated circuit 60 measures a first cell voltage between first and second sense lines 41, 42 in the first balancing circuit 31 at a first time while the first cell balancing circuit 31 is turned off, and determines a first cell voltage value based on the first cell voltage. After step 404, the method advances to step 406.

At step 406, the integrated circuit 60 measures a second cell voltage between the second sense line 42 and a third sense line 43 in the second balancing circuit 32 at the first time while the second cell balancing circuit 32 is turned off, and determines a second cell voltage value based on the second cell voltage. After step 406, the method advances to step 408.

At step 408, the integrated circuit 60 measures a third cell voltage between the third sense line 43 and a fourth sense line 44 in the third balancing circuit 33 at the first time while the third cell balancing circuit 33 is turned off, and determines a third cell voltage value based on the third cell voltage. After step 408, the method advances to step 410.

At step 410, the integrated circuit 60 sends the first, second, and third cell voltage values to the microcontroller 62. After step 410, the method advances to step 420.

At step 420, the microcontroller 62 makes a determination as to whether the first cell voltage value is greater than a first threshold voltage value, or the second cell voltage value is less than a second threshold voltage value. The first threshold voltage value is greater than the second threshold voltage value. If the value of step 420, equals "yes", the method advances to step 422. Otherwise, the method advances to step 428.

At step 422, the microcontroller 62 determines that an open circuit condition exists in the first balancing circuit 31. After step 422, the method advances to step 424.

At step 424, the microcontroller 62 outputs a first diagnostic code indicating the open circuit condition exists in the first balancing circuit 31, to the vehicle controller 64. After step 424, the method advances to step 426.

At step 426, the vehicle controller 64 generates a first control message to induce the display device 66 to display the first diagnostic code. After step 426, the method advances to step 428.

At step 428, the microcontroller 62 makes a determination as to whether the third cell voltage value is greater than a third threshold voltage value, or the second cell voltage value is less than the second threshold voltage value. If the value of step 428 equals "yes", the method advances to step 430. Otherwise, the method is exited. In an embodiment, the third threshold voltage value is equal to the first threshold voltage value.

At step 430, the microcontroller 62 determines that an open circuit condition exists in the second balancing circuit 32 at the node 109. After step 430, the method advances to step 432.

At step 432, the microcontroller 62 outputs a second diagnostic code indicating the open circuit condition exists in the second balancing circuit 32, to the vehicle controller 64. After step 432, the method advances to step 434.

At step 434, the vehicle controller 64 generates a second control message to induce the display device 66 to display the second diagnostic code. After step 434, the method is exited.

The above-described method can be at least partially embodied in the form of one or more memory devices or computer readable media having computer-executable instructions for practicing the method. The memory device can comprise one or more of the following: hard drives, RAM memory, flash memory, and other computer-readable media known to those skilled in the art; wherein, when the computer-executable instructions are loaded into and executed by one or more microcontrollers or processors, the one or more microcontrollers or processors become an apparatus programmed to practice the associated steps of the method.

The battery system described herein provides a substantial advantage over other battery systems. In particular, the battery system has a technical effect of utilizing at least first and second resistors in first and second cell balancing circuits with different resistance value to pre-bias the cell voltage inputs received by an integrated circuit to a specific known value pattern to detect an open circuit condition in the first and second cell balancing circuits.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery system, comprising:
a first cell balancing circuit electrically coupled to first and second sense lines and to first and second electrical terminals of a first battery cell; the first cell balancing circuit having a first transistor electrically coupled in parallel to the first battery cell, and a first resistor electrically coupled to the first and second sense lines;
a second cell balancing circuit electrically coupled to the second sense line and a third sense line and to first and second electrical terminals of a second battery cell; the second cell balancing circuit having a second transistor electrically coupled in parallel to the second battery cell, and a second resistor electrically coupled to the second and third sense lines; the first resistor having a first resistance that is greater than a second resistance of the second resistor;
a microcontroller commanding each of the first and second transistors to transition to an open operational state such that the first and second balancing circuits, respectively, are turned off;
an integrated circuit measuring a first cell voltage between the first and second sense lines and across the first resistor at a first time while the first cell balancing circuit is turned off, and a second cell voltage between the second and third sense lines and across the second resistor at the first time while the second cell balancing circuit is turned off, and determining first and second cell voltage values based on the first and second cell voltages, respectively, the first and second cell voltage values being associated with the first and second resistors, respectively;
the microcontroller receiving the first and second cell voltage values and determining that an open circuit condition exists in the first balancing circuit when both of first and second conditions are satisfied, wherein the first condition is satisfied if the first cell voltage value associated with the first resistor is greater than a first threshold voltage value, and the second condition is satisfied if the second cell voltage value associated with the second resistor is less than a second threshold voltage value, the first threshold voltage value is greater than the second threshold voltage value;
a third cell balancing circuit electrically coupled to the third sense line and a fourth sense line and to first and second electrical terminals of a third battery cell, the third cell balancing circuit having a third transistor electrically coupled in parallel to the third battery cell, and a third resistor electrically coupled to the third and fourth sense lines; the third resistor having a third resistance greater than the second resistance of the second resistor;
the microcontroller commanding the third transistor to transition to the open operational state such that the third balancing circuit is turned off;
the integrated circuit measuring a third cell voltage between the third and fourth sense lines at the first time while the third cell balancing circuit is turned off and determining a third cell voltage value based on the third cell voltage; and the microcontroller receiving the third voltage value and determining that an open circuit condition exists in the second balancing circuit when both of third and fourth conditions are satisfied, wherein the third condition is satisfied if the third cell voltage value is greater than a third threshold voltage value, and the fourth condition is satisfied if the second cell voltage value is less than the second threshold voltage value, the microcontroller receiving the third voltage value and determining that an open circuit condition exists in the second balancing circuit when both of third and fifth conditions are satisfied, wherein the third condition is satisfied if the third cell voltage value is greater than a third threshold voltage value, and the fifth condition is satisfied if the first cell voltage value is less than or equal to the first threshold voltage value.

2. The battery system of claim 1, wherein the first terminal of the first battery cell being electrically coupled in series with the first sense line, and the second terminal of the first battery cell being electrically coupled in series with the second sense line.

3. The battery system of claim 2, wherein the integrated circuit is electrically coupled to the first and second sense lines and to the microcontroller.

4. The battery system of claim 1, wherein:
the microcontroller commanding the first transistor to transition to the open operational state by sending a first command message to the integrated circuit; and
the integrated circuit outputting a first control signal to induce the first transistor to transition to the open operational state, in response to the first command message.

5. The battery system of claim 1, wherein the third threshold voltage value is equal to the first threshold voltage value.

6. The battery system of claim 1, wherein the first terminal of the third battery cell being electrically coupled in series with the third sense line, and the second terminal of the third battery cell being electrically coupled in series with the fourth sense line.

7. The battery system of claim 6, wherein the integrated circuit is electrically coupled to the first, second, third, and fourth sense lines.

8. A battery system, comprising:
a first cell balancing circuit electrically coupled to first and second sense lines and to first and second electrical terminals of a first battery cell; the first cell balancing circuit having a first transistor electrically coupled in parallel to the first battery cell, and a first resistor electrically coupled to the first and second sense lines;
a second cell balancing circuit electrically coupled to the second sense line and a third sense line and to first and second electrical terminals of a second battery cell; the second cell balancing circuit having a second transistor electrically coupled in parallel to the second battery cell, and a second resistor electrically coupled to the second and third sense lines; the first resistor having a first resistance that is greater than a second resistance of the second resistor;

a microcontroller commanding each of the first and second transistors to transition to an open operational state such that the first and second balancing circuits, respectively, are turned off;

an integrated circuit measuring a first cell voltage between the first and second sense lines and across the first resistor at a first time while the first cell balancing circuit is turned off, and a second cell voltage between the second and third sense lines and across the second resistor at the first time while the second cell balancing circuit is turned off, and determining first and second cell voltage values based on the first and second cell voltages, respectively, the first and second cell voltage values being associated with the first and second resistors, respectively, the integrated circuit being electrically coupled to the first, second, and third sense lines;

the microcontroller receiving the first and second cell voltage values and determining that an open circuit condition exists in the first balancing circuit when both of first and second conditions are satisfied, wherein the first condition is satisfied if the first cell voltage value associated with the first resistor is greater than a first threshold voltage value, and the second condition is satisfied if the second cell voltage value associated with the second resistor is less than a second threshold voltage value, the first threshold voltage value is greater than the second threshold voltage value;

a third cell balancing circuit electrically coupled to the third sense line and a fourth sense line and to first and second electrical terminals of a third battery cell, the third cell balancing circuit having a third transistor electrically coupled in parallel to the third battery cell, and a third resistor electrically coupled to the third and fourth sense lines; the third resistor having a third resistance greater than the second resistance of the second resistor;

the microcontroller commanding the third transistor to transition to the open operational state such that the third balancing circuit is turned off;

the integrated circuit measuring a third cell voltage between the third and fourth sense lines at the first time while the third cell balancing circuit is turned off and determining a third cell voltage value based on the third cell voltage; and the microcontroller receiving the third voltage value and determining that an open circuit condition exists in the second balancing circuit when both of third and fourth conditions are satisfied, wherein the third condition is satisfied if the third cell voltage value is greater than a third threshold voltage value, and the fourth condition is satisfied if the second cell voltage value is less than the second threshold voltage value, the microcontroller receiving the third voltage value and determining that an open circuit condition exists in the second balancing circuit when both of third and fifth conditions are satisfied, wherein the third condition is satisfied if the third cell voltage value is greater than a third threshold voltage value, and the fifth condition is satisfied if the first cell voltage value is less than or equal to the first threshold voltage value.

* * * * *